D'ORSAY McCALL WHITE.
RADIATOR CROSS MEMBER SUPPORT.
APPLICATION FILED FEB. 24, 1920.
1,366,228.
Patented Jan. 18, 1921.
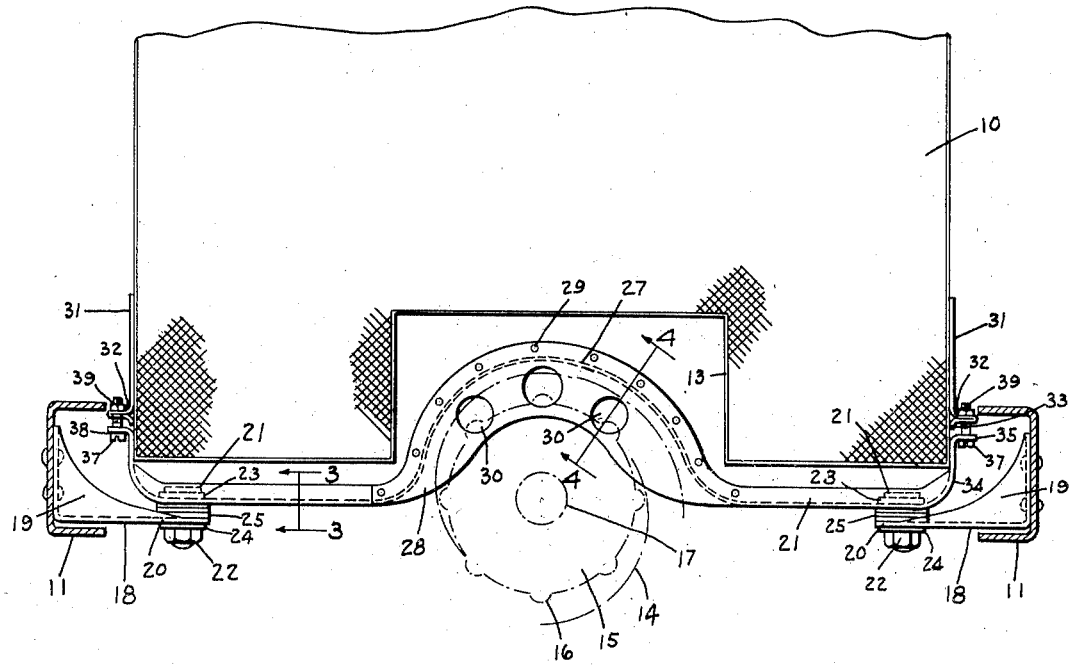
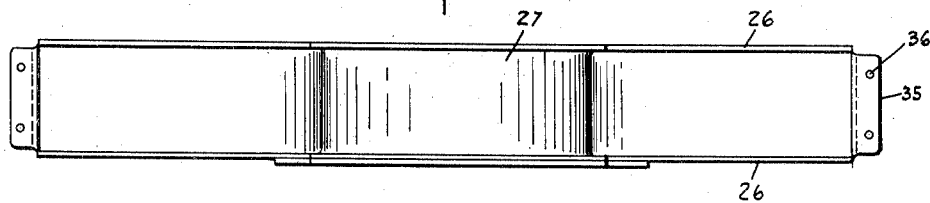
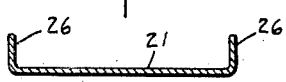
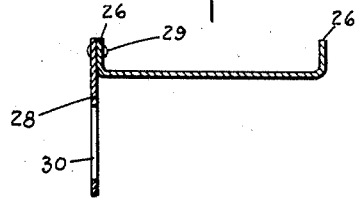
INVENTOR.
D'ORSAY McCALL WHITE
BY
Lockwood & Lockwood
ATTORNEYS.

UNITED STATES PATENT OFFICE.

D'ORSAY McCALL WHITE, OF INDIANAPOLIS, INDIANA, ASSIGNOR TO LA FAYETTE MOTORS COMPANY, OF INDIANAPOLIS, INDIANA, A CORPORATION.

RADIATOR CROSS-MEMBER SUPPORT.

1,366,228.     Specification of Letters Patent.     Patented Jan. 18, 1921.

Application filed February 24, 1920. Serial No. 360,866.

*To all whom it may concern:*

Be it known that I, D'ORSAY McCALL WHITE, a subject of the Kingdom of Great Britain, and a resident of Indianapolis, county of Marion, and State of Indiana, have invented a certain new and useful Radiator Cross-Member Support; and I do hereby declare that the following is a full, clear, and exact description thereof, reference being had to the accompanying drawings, in which like numerals refer to like parts.

The chief object of this invention is to provide an arched radiator cross member which is adapted to be secured to the chassis frame, and in turn support a radiator core, which arched construction will permit the mounting of the water pump upon the crank shaft and the positioning of the radiator core substantially above the same.

One feature of the invention consists in reinforcing the arched portion of the cross member support for strengthening the same to eliminate the flexing thereof.

Another feature of the invention consists in providing the reinforcing plate with suitable openings through which access may be had to the water pump casing and which also serves to lengthen the reinforcing plate.

Still another feature of the invention is the manner in which the radiator core is flexibly supported on the chassis frame so that the weaving of the side bars will not be transmitted to the core. This is accomplished by means of the resilient mounting between the cross member support and the supporting bracket, which will compensate for any wearing movement.

The full nature of this invention will be understood from the accompanying drawings and the following description and claims.

In the drawings Figure 1 is a front elevational view of the radiator core, chassis frame and the radiator supporting cross member. Fig. 2 is a top plan view of the radiator cross member support. Fig. 3 is a sectional view of the same taken on the line 3—3 of Fig. 1. Fig. 4 is a sectional view taken on the line 4—4 of Fig. 1.

In the drawings there is shown a radiator core 10 and a chassis frame 11. The radiator core is herein shown provided with a central portion 13, the same being cut away so that beneath the radiator there may be mounted a water pump 14, herein shown dotted, provided with a cover plate 15 secured thereto by bolts 16 and the like, said pump being mounted on the crank shaft 17.

The chassis frame 11 is herein shown channel-shaped in cross section and suitably secured in the bed of said channel and facing each other are a pair of angle brackets 18, said angle brackets having a reinforcing rib 19 formed thereon, and carrying on their inwardly adjacent edges a bearing portion 20. The radiator supporting cross member 21 is suitably secured to the brackets 18 by bolts 21 and nuts 22, said securing means also including a pair of metal washers 23 and 24 and suitable pads or resilient spring means or washers 25. The cross member support is herein shown channel shaped, see Fig. 3, the same being provided with upwardly extending channel sides 26. The central portion of said cross member support is herein shown bent upwardly and forming an arch portion 27. Secured to one channel side upon said arch portion of said cross member support is a complementarily shaped reinforcing plate 28, said plate being suitably secured to said channel side preferably the forward side by means of rivets 29 and the like. Said reinforcing plate is herein shown provided with circular openings 30 which lighten the same in the usual manner, and which may be positioned to provide access to the water cover securing means 16, substantially as shown in Fig. 1. It will be understood that the reinforcing plate is provided to strengthen the arched portion of said cross member and make the same rigid with respect to the entire cross member so that any stress set up in the frame will not be transmitted through the resilient washers 25 and dissipated in the arch 27, but will be dissipated in the resilient portions 25 as is customary in the usual radiator construction.

Upon the lower portion of each side of the radiator core 10 there is secured a depending strap portion 31, said strap portion extending outwardly to form a flange member 32 and being pointed inwardly to form a support bracing portion 33, said strap terminating along the side of said radiator and adjacent the bottom portion thereof. The radiator cross member 21 is provided with an upwardly extending core 10 and having the outer edge 35 extending outwardly and substantially parallel to the flange 32. The flanges or brackets 32 and 35 are provided with registering openings 36, the same seating the bolts 37, said bolts being suitably secured therein by means of the locking washer 38 and the locking nut 39. With this means the radiator core is secured to and upon the radiator cross member support and by the means before described said cross member support is resiliently supported upon the chassis frame 11.

Those skilled in the art will readily understand that the radiator core must be mounted in a flexible manner, since the many soldered connections of the core require that the same be rigid within itself, yet be mounted upon the frame in such a manner that the stress and twists thereof will be dissipated before reaching the radiator so that the same will not be dissipated in the radiator. This construction provides an arched support for a radiator core and rigidly mounts the same, and in turn is resiliently supported upon the frame for the reasons indicated. This arched construction permits the mounting of the water pump structure upon the crank shaft of the engine and also permits the radiator core to extend downwardly upon both sides of said water pump and, therefore, increases the radiating or cooling surface of the core.

The invention claimed is:

1. In a radiator construction, the combination with a chassis frame and a radiator core, of a radiator support having a central upwardly arched portion and provided with upwardly extending end portions adapted to lie adjacent the sides of said radiator core, means secured to the side of said radiator core for securing said radiator to the upwardly extending ends, and means intermediate said ends and arched portion for supporting said support in said chassis frame.

2. In a radiator support construction the combination of a chassis frame, a radiator support having a central arched portion and outwardly extending end portions, means for securing said radiator support to said chassis frame, and reinforcing means secured to said radiator support adjacent said arched portion.

3. A radiator cross member support comprising a channel shaped body portion and a pair of end portions bent upwardly and outwardly, said channel shaped portion having the central portion thereof bent to form an arch, and reinforcing means secured to said arched portion.

4. In a radiator support construction the combination with a crank shaft of an engine and a water pump on said shaft having a removable cover plate on the forward face thereof, of a radiator cross member support having a central upwardly arched portion positioned centrally of said shaft and pump, and a reinforcing plate secured to said arched portion and provided with a plurality of openings, said openings lightening said reinforcing plate and providing access to the cover plate of said water pump.

5. In a radiator construction the combination with a chassis frame and a radiator core, an arched radiator support having a central arched portion, a reinforcing plate secured to said support upon and adjacent said arched portion and upwardly and outwardly extending end portions adapted to lie adjacent the sides of said radiator core, means secured to said radiator core sides in juxta-position to said outwardly extending end portions, and means securing said outwardly extending ends to said radiator side securing means.

In witness whereof, I have hereunto affixed my signature.

D'ORSAY McCALL WHITE.